(12) United States Patent
Asano

(10) Patent No.: US 7,287,716 B2
(45) Date of Patent: Oct. 30, 2007

(54) MAGNETIC TAPE CARTRIDGE

(75) Inventor: Katsuki Asano, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 11/071,205

(22) Filed: Mar. 4, 2005

(65) Prior Publication Data

US 2005/0230513 A1    Oct. 20, 2005

(30) Foreign Application Priority Data

Mar. 5, 2004   (JP)   ............................... 2004-061477

(51) Int. Cl.
*G11B 23/107* (2006.01)
(52) U.S. Cl. ..................... 242/348; 360/132
(58) Field of Classification Search ................ 242/348, 242/348.2; 360/132
See application file for complete search history.

(56) References Cited

U.S. PATENT DOCUMENTS

| 6,568,619 B1 | 5/2003 | Shiga et al. |
| 6,700,742 B2 | 3/2004 | Tsuyuki et al. |
| 2002/0181152 A1 | 12/2002 | Tsuyuki et al. |
| 2003/0001038 A1 | 1/2003 | Hiraguchi et al. |
| 2003/0146327 A1 | 8/2003 | Satch et al. |

FOREIGN PATENT DOCUMENTS

| EP | 1148500 A1 | 10/2001 |
| JP | 2000048526 | 2/0000 |
| JP | 2000-48526 A | 2/2000 |
| JP | 2002-93108 A | 3/2002 |

*Primary Examiner*—John Q. Nguyen
(74) *Attorney, Agent, or Firm*—Sughrue Mion Pllc.

(57) ABSTRACT

In a magnetic tape cartridge (1) having a metal plate (25) at the central portion of the bottom surface of a reel hub (21) with a reel gear (24) being defined around its periphery, the metal plate (25) is disposed in a manner such that the outer periphery of the metal plate (25) is positioned under the inner facing surface of the reel gear (24). As a result, occurrence of a sink mark during molding at a portion where the reel gear (24) is formed and deformation of the reel hub (21) due to tape widing tention are prevented.

6 Claims, 4 Drawing Sheets

MAGNETIC TAPE CARTRIDGE

BACKGROUND OF THE INVENTION

1. Field of the Invention

The present invention relate to a magnetic tape cartridge, and particularly to a magnetic tape cartridge comprising a cartridge case and a single reel which is rotatably housed in the cartridge case, wherein the single reel includes a reel hub around which a magnetic tape is wound.

2. Description of the Related Art

Conventionally, as magnetic tape cartridges that are used as storage media for an external storage unit of a computer and the like, there have been known those having a cartridge case which rotatably houses a single reel around which a magnetic tape is wound.

As described, for example, in Japanese Unexamined Patent Publication No. 2000-48526, magnetic tape cartridges of this type generally have a cartridge case in which a single reel is rotatably housed. The single reel comprises a resin reel hub, and upper and lower flanges respectively extending radially outward from the outer peripheries of the upper and lower ends of the reel hub. A magnetic tape is wound around the reel hub, and the lower end of the reel hub is closed by a bottom wall.

FIG. 6A is a bottom view showing a reel of a magnetic tape cartridge described in aforementioned Japanese Unexamined Patent Publication No. 2000-48526, with a reel gear being partially removed. FIG. 7 is an enlarged sectional view of the reel taken along line 7-7 in FIG. 6A. Further, reference numeral 2 indicates a synthetic resin reel, 21 indicates a reel hub, 21a indicates a bottom wall of the reel hub 21, and 22 is a lower flange of the reel 2. A crown gear type reel gear 24 to be meshed with a driving gear of a rotary driving member provided in a drive device (for simplicity purposes, hereinafter referred to as a "drive-side rotary driving member") is formed in an annular form with the reel hub 21 at an outer peripheral portion of a lower surface of the bottom wall 21a of the reel hub 21. Further, a disk-shaped metal plate 25' as shown in FIG. 6B is attached to the reel gear 24 by insert molding so as to be positioned concentric with and radially inward of the reel gear 24 for magnetic attraction with respect to the drive-side rotary driving member, thus maintaining the meshed state between the reel gear 24 and the driving gear.

The reel gear 24 of the reel hub 21 is an important part that serves as a reference for measuring the dimensions of the reel and the like. As is apparent from FIG. 7, a portion where the reel gear 24 is formed has a thickness greater than that of the remaining portions, and a so-called "sink mark" is apt to occur during molding. This is one of the causes of narrowing the range of molding conditions.

Further, in the magnetic tape cartridges of this type, as disclosed in, for example, U.S. Pat. No. 6,700,742, a locking member that is movable in an axial direction of the reel 2 between a locked position for blocking rotation of the reel 2 when the magnetic tape cartridge is in a not-operating state and a release position for releasing a locked state of the reel 2; an urging member (coil spring) for urging the locking member in the direction toward the locked position thereof; and a releasing member for moving the locking member in the direction toward the release position thereof in association with meshing between the driving gear of the drive-side rotary driving member and the reel gear 24; are provided within the reel hub 21. The locking member has lock teeth which are brought into mesh with lock teeth provided on the upper surface of the bottom wall 21a of the reel hub 21, and the reel 2 is thereby forcibly locked to block the rotation of the reel when the magnetic tape cartridge is in the non-operating state. In this manner, the tape cartridge is constructed such that the winding of the magnetic tape is not tightened or loosened upon impact due to being dropped or the like.

The aforementioned releasing member (e.g., release pad) has, as disclosed, for example, in U.S. Patent Application Publication No. 20020181152, comprises three legs which respectively protrude outward through three through holes 26 formed in a pawl portion of the reel gear 24, when the driving gear and the reel gear 24 are not meshed with each other. In association with meshing between the reel gear 24 and the driving gear, these legs are pushed back into the through holes 26, and hence the releasing member pushes the locking member up against the urging force of the urging member. As a result, the meshing between the aforementioned lock teeth is released and the reel 2 is thereby allowed to rotate.

In view of the foregoing, an object of the present invention is to broaden the range of hub molding conditions by preventing a "sink mark" from occurring during molding by preventing the thickness of the portion where the reel gear is formed from becoming larger than that of the remaining portions.

SUMMARY OF THE INVENTION

In accordance with the present invention, there is provided a magnetic tape cartridge comprising a cartridge case, and a single reel which is rotatably housed in the cartridge case, the single reel having: (a) a reel hub around which a magnetic tape is wound and a lower part of which is closed by a bottom wall, (b) upper and lower flanges respectively extending radially outward from the outer peripheries of the upper and lower ends of the reel hub, (c) a reel gear provided in an annular form at an outer peripheral portion of a lower surface of the bottom wall of the reel hub so as to be meshable with a driving gear of a drive-side rotary driving member provided in a drive device; and (d) a metal plate which is to be magnetically attracted by the drive-side rotary driving member, wherein the metal plate is disposed on the bottom wall of the reel hub in a manner such that an outer periphery of the metal plate is positioned under the inner facing surface of the reel gear.

In this case, it is preferable that the outer periphery of the metal plate is positioned under the inner facing surface of the reel gear in a manner such that the outer peripheral edge of the metal plate reaches at least a middle of a radial width of a pawl portion of the reel gear. It is further preferable that the outer periphery of the metal plate is positioned under the inner facing surface of the reel gear in a manner such that the outer peripheral edge of the metal plate reaches a radially outermost end of the radial width of the pawl portion of the reel gear.

When the magnetic tape cartridge further comprises: a locking member that is movable in an axial direction of the reel between a locked position for blocking rotation of the reel and a release position for releasing a locked state of the reel 2; and a releasing member for moving the locking member in the direction toward the release position in association with meshing between a driving gear of a drive-side rotary driving member and the reel gear, wherein the locking member and the releasing member are provided within the reel hub, and wherein the releasing member includes a plurality of legs which respectively project outward through a plurality of through holes formed in the pawl portion of the reel gear when the driving gear and the reel gear are not meshed with each other, and are respectively pushed back into the plurality of through holes in association with meshing between the reel gear and the driving gear, and cutouts are formed in the outer peripheral edge of the metal plate such that the cutouts do not overlap the through holes formed in the pawl portion of the reel gear.

In the conventional magnetic tape cartridges, a disk-shaped metal plate is disposed radially inward of a reel gear which is provided in an annular form at an outer peripheral portion of a lower surface of the bottom wall of a reel hub. Thus, the thickness of the portion where the reel gear is formed becomes greater than that of the remaining portions, thus causing a "sink mark" during molding. In accordance with the present invention, a metal plate which has a larger diameter than that of a conventional metal plate is used, and the outer periphery of the metal plate is positioned under the inner facing surface of the reel gear. As a result, the thickness of a portion where the reel gear is formed becomes smaller than that of the conventional products, and therefore a sink mark becomes less likely to occur during molding.

Further, the conventional magnetic tape cartridge also suffers from the problem that the reel flange is brought into abutment with the magnetic tape due to the deformation of the reel hub resulting from the tension of the magnetic tape when wound around the reel, thereby damaging one or both lateral edges of the magnetic tape. However, when the metal plate is disposed such that an outer periphery of the metal plate is positioned under the inner facing surface of the reel gear in a manner such that the outer peripheral edge of the metal plate reaches the radially outermost end of the radial width of the pawl portion of the reel gear, the periphery of the metal plate comes close to the rim of the reel hub, whereby an effect that the stiff metal plate suppresses deformation of the reel hub when tape is wound can also be expected. In addition, due to the increased mass of the metal plate, the meshed state between the reel gear and the driving gear during chucking can be maintained more reliably.

DESCRIPTION OF THE PREFERRED EMBODIMENTS

Hereinafter, a preferred embodiment of the present invention will be described in detail with reference to the drawings.

Figure 1:
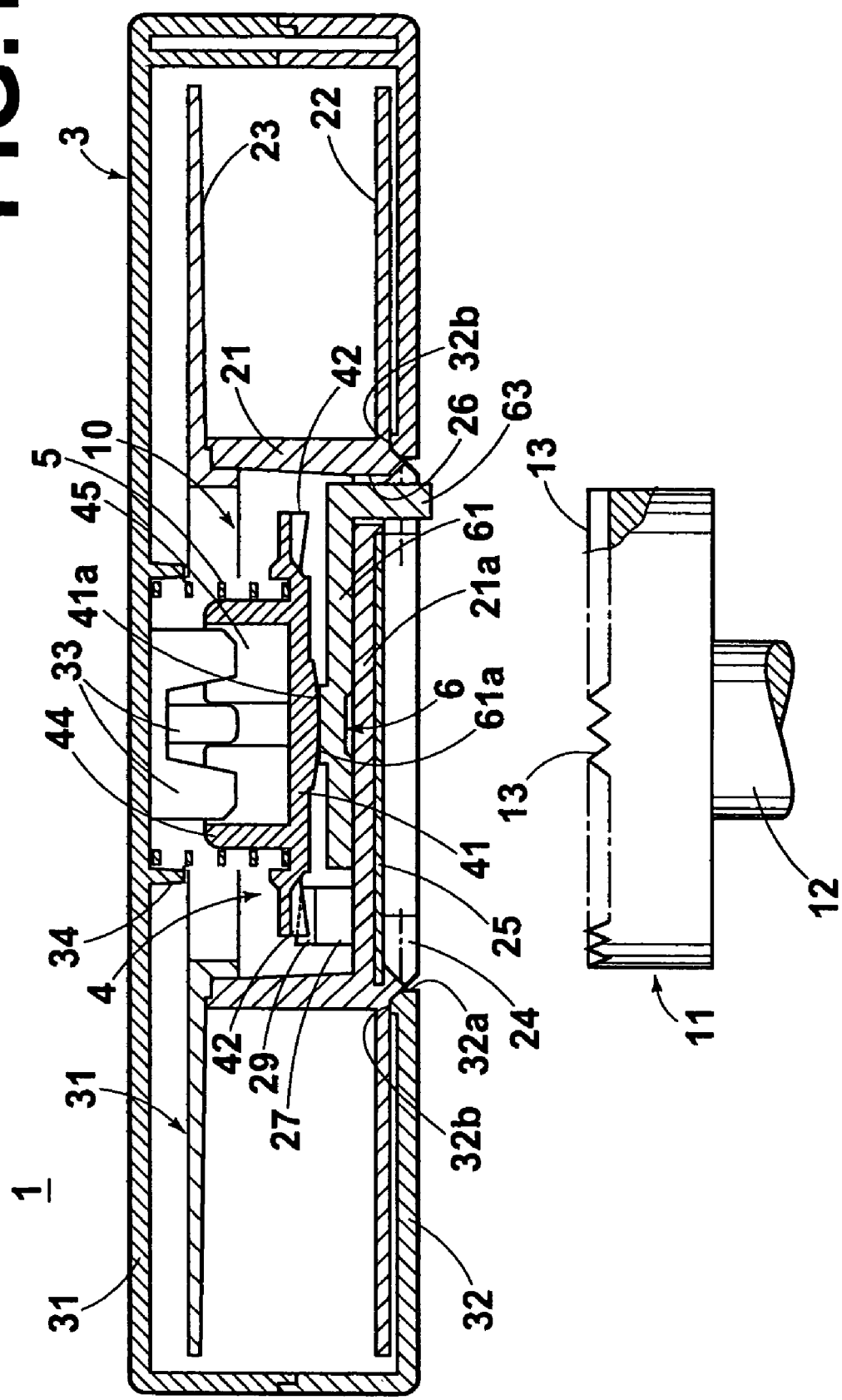
FIG. 1 is a cross-sectional elevation view of a magnetic tape cartridge according to an embodiment of the invention, with the magnetic tape cartridge being in a non-operating state.
Figure 2:
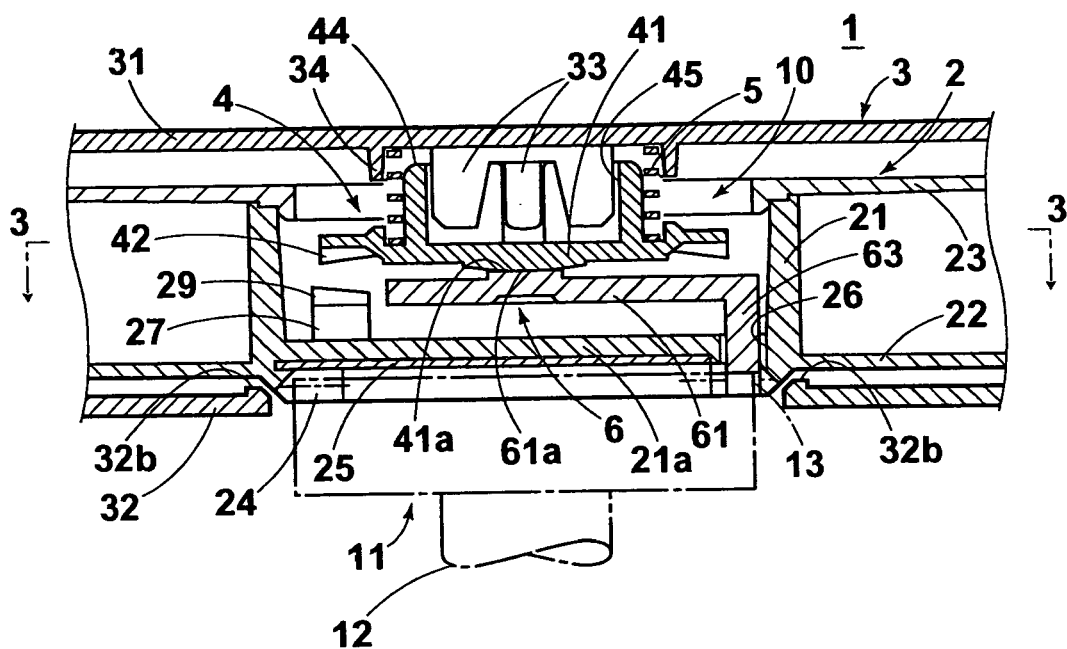
FIG. 2 is a sectional view of the essential part of the magnetic tape cartridge in FIG. 1, with the magnetic tape cartridge being in an operating state.
Figure 3:
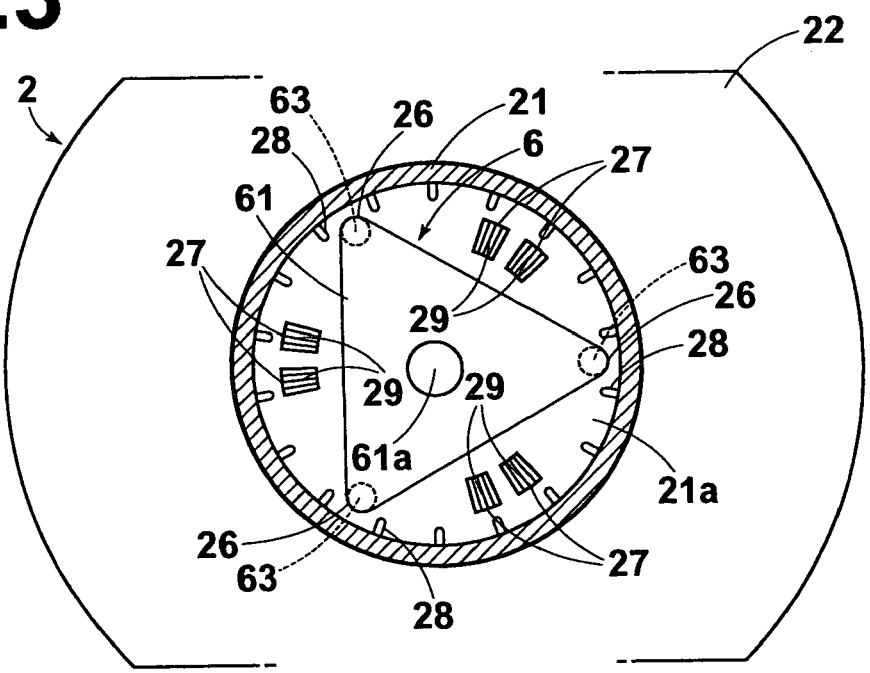
FIG. 3 is a plan view in section taken along line 3-3 of FIG. 2.
Figure 4A:
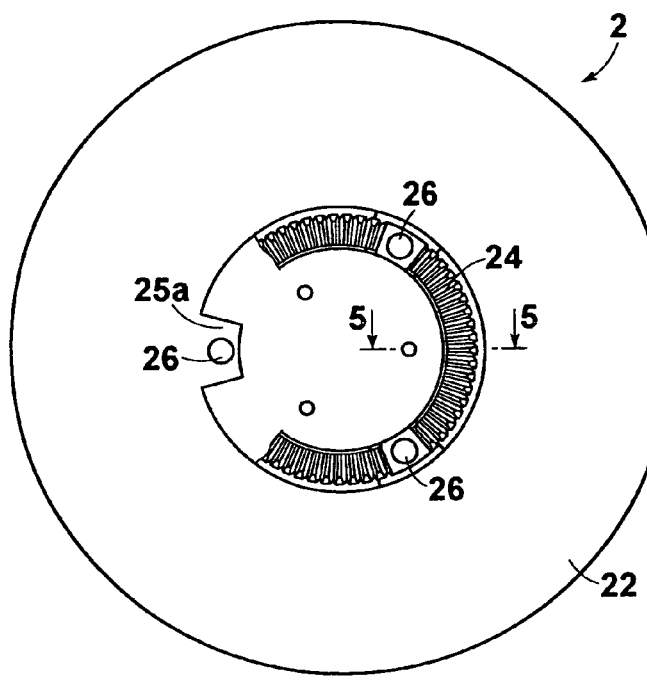
FIG. 4A is a bottom view of the magnetic tape cartridge of the invention, with a reel gear being partially removed.
Figure 4B:
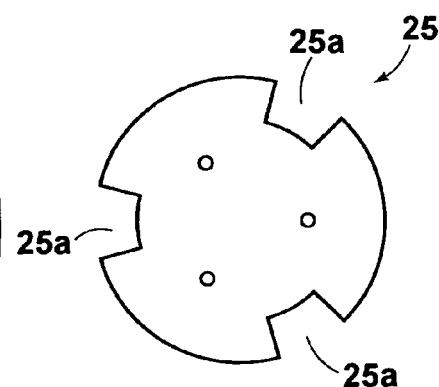
FIG. 4B is a bottom view of a metal plate used in the magnetic tape cartridge shown in FIG. 4A.
Figure 5:
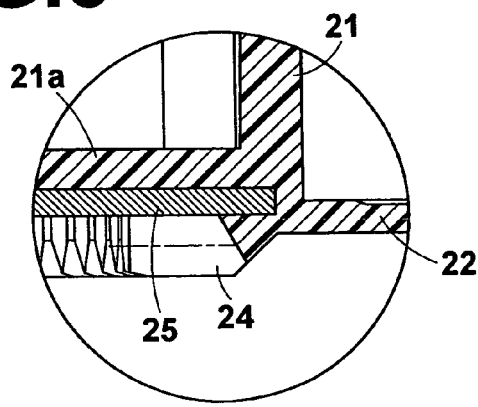
FIG. 5 is an enlarged cross-sectional view of the reel taken along line 5-5 in FIG. 4A.

FIG. 1 is a cross sectional view of a magnetic tape cartridge according to an embodiment of the invention, with the magnetic tape cartridge being in a non-operating state before chucking of a drive-side rotary driving member. FIG. 2 is a sectional view of the essential part of the magnetic tape cartridge in FIG. 1, with the magnetic tape cartridge being in an operating state after chucking. FIG. 3 is a plan view in section taken along line 3-3 of FIG. 2. FIG. 4A is a bottom view of a reel of the magnetic tape cartridge with a reel gear being partially removed, and FIG. 4B is a bottom view of a metal plate. FIG. 5 is an enlarged cross-sectional view of the reel taken along line 5-5 in FIG. 4A.

Referring to FIG. 1, a magnetic tape cartridge 1 has a cartridge case 3 constituted by an upper case 31 and a lower case 32 that has an opening 32a at a central portion thereof and is fastened to the upper case 31 by screws or the like. A single reel 2 around which a magnetic tape (not shown) is wound is rotatably housed within the cartridge case 3, and a reel locking mechanism 10 for blocking rotation of the reel by locking the reel 2 when the magnetic tape cartridge is in a non-operating state is disposed within a center hole of the reel 2.

The reel 2 comprises a reel hub 21 which is shaped in the form of a tubular member closed at its one end and around which the magnetic tape is wound; and lower and upper flanges 22 and 23 respectively extending radially outward from the outer peripheries of the upper and lower ends of the reel hub 21. The reel hub 21 and the lower flange 22 are integrally formed of a synthetic resin material. The upper flange 23, which is also formed of a synthetic resin material, is fixed to the reel hub 21 by ultrasonic welding, for example, while the upper flange 23 is fitted to a top end of the reel hub 21.

The center side lower portion of the reel hub is closed by a bottom wall 21a, and a crown gear type reel gear 24, which is meshable with a driving gear 13 of a drive-side rotary driving member 11, is provided in an annular form at an outer peripheral portion of a lower surface of the bottom wall 21a of the reel hub 21. Further, a metal plate 25 shaped as shown in FIG. 4B is attached to the lower surface of the bottom wall 21a of the reel hub 21 by insert molding. In the outer peripheral edge of the metal plate 25, three cutouts 25a are formed such that the cutouts 25a do not overlap three through holes 26 formed in a pawl portion of the reel gear 24.

The metal plate 25 is provided because the metal plate 25 is magnetically attracted to the drive-side rotary driving member 11, thus maintaining the meshed state between the reel gear 24 and the driving gear 13. As can be seen from FIG. 4A and FIG. 5, the metal plate 25 has an outer diameter that is substantially equal to the outer diameter of the pawl portion of the reel gear 24. The outer periphery of the metal plate 25 is positioned under the inner facing surface of the reel gear such that the entire inner facing surface of the reel gear 24 is covered by the outer periphery of the metal plate 25. The outer peripheral edge of the metal plate 25 reaches the radially outermost end of the pawl portion of the reel gear 24. The reel gear 24 and the metal plate 25 are arranged so as to be exposed through the opening 32a in the bottom surface of the cartridge case 3.

The peripheral edge portion around the opening 32a is raised in an annular form, and the upper surface of the raised portion defines a supporting surface 32b for supporting the lower surface of the lower flange 22 of the reel 2 when the magnetic tape cartridge is in a non-operating state. The reel 2 is urged downward by an urging member (coil spring) 5 provided in the reel locking mechanism 10 described later, thereby being in abutment with the supporting surface 32b.

Meanwhile, the drive-side rotary driving member 11 includes an annular driving gear 13 and a magnet (not shown), both of which are disposed on the upper surface of a disk portion 15 fixed to the upper end of a rotating shaft 12.

A chucking operation of the aforementioned rotary driving member 11 is effected by lowering toward the rotating shaft 12 a magnetic tape cartridge 1 loaded in a drive-side bucket (not shown), meshing the driving gear 13 with the reel gear 24, and maintaining the meshed state therebetween due to magnetic attraction of the magnet attracting the reel plate 25.

The construction of the reel locking mechanism 10 will be described below. The reel locking mechanism 10 comprises: a locking member 4 that is movable in an axial direction of the reel 2 between a locked position and a release position; an urging member (coil spring) 5 for urging the locking member in the direction toward the locked position thereof; and a releasing member (release pad) 6 for moving the locking member 4 in the direction toward the release position thereof.

Three through holes 26 (see FIG. 3 and FIG. 4A), which extend vertically through the pawl portion of the reel gear, are circumferentially disposed at equidistant intervals from one another. Further, three pairs (i.e. six pieces) of interlocking protrusions 27, which extend vertically are formed integrally with the bottom wall 21a on the upper surface thereof, are circumferentially disposed at equidistant intervals from one another such that the interlocking protrusions 27 do not overlap the through holes 26. A lock tooth 29 is provided at each extremity of the interlocking protrusions 27.

The locking member 4 is formed of a synthetic resin material and provided with a disk portion 41. The disk portion 41 is placed within the reel hub 21 facing the bottom wall 21a of the reel hub 21. Lock teeth 42, which are meshable with the lock teeth 29 of the interlocking protrusions 27, are arranged annularly at an outer peripheral portion of a lower surface of the disk portion 41. A spherical sliding portion 41a is defined at the central portion of the lower surface of the disk portion 41 so as to project therefrom. Under the urging force of the urging member 5, the sliding portion 41a is brought into abutment with a sliding portion 61a which is defined at the central portion of the upper surface of the body portion 61 of a releasing member 6 (described later).

Each of the lock teeth 42 and 29 is formed in a conical shape so that the tooth height is greater towards the outer periphery of disk portion 41. Thus the radially outer side of the tooth is first brought into mesh with the radially outer side of the corresponding tooth.

An upward extending projection 44 is disposed on the upper surface of the disk portion 41 of the locking member 4. A crucial interlocking groove 45, which extend vertically, is formed in the projection 44. Meanwhile, a supporting portion 33 (a protrusion for blocking rotation) to be inserted into the interlocking groove 45 is provided upright on the inner surface of the upper case 31 of the cartridge case 3. Meshing the interlocking groove 45 with the supporting portion 33 enables the locking member 4 to move vertically with the rotation thereof being blocked.

A biasing member 5 constituted by a coil spring is positioned in a compressed state between the upper surface of the disk portion 41 at a region disposed radially outward from the projection 44 of the locking member 4 and a spring bearing 34 provided radially outward of the supporting portion 33 of the upper case 31, whereby the lock teeth 42 of the locking member 4 are urged in a direction of meshing with the locking teeth 29 of the reel 2.

The releasing member 6 is interposed between the locking member 4 and the bottom surface 21a of the reel hub 21 in a vertically movable manner, and downward extending cylindrical legs 63 are respectively arranged on the lower surface of an approximately triangular body 61 in the vicinity of the apexes thereof. Each leg 63 is movably inserted through each through hole 26 formed in the bottom surface 21a of the reel 2, and the tip of the leg 63 is positioned to be opposed to the pawl portion of the reel gear 24 disposed on the lower surface of the reel 2. At this time, the aforementioned interlocking protrusions are arranged radially outward of the body portion 61 and between the adjacent legs 63. It is to be noted that the leg 63 may be formed in a prismatic shape or an elliptically cylindrical shape.

When the releasing member 6 is situated at its lowermost position (see FIG. 1), the tip of the leg 63 protrudes from the lower surface of the reel gear 24. In association with the meshed state between the reel gear 24 and the driving gear 13 as a result of the chucking operation of the drive-side rotary driving member 11, the releasing member 6 is pressed upward and pushed up over a predetermined stroke amount (see FIG. 2). The reel 2 is also pushed up slightly by the driving gear 13 and separated from the lower case 32. Since the legs 63 are fitted within the through holes 26, the releasing member 6 rotates as one with the reel 2.

A number of ribs 26, which extend in the axial direction of the reel 2, are formed on an inner peripheral surface of the reel 2 so as to be spaced at predetermined intervals from one another in the circumferential direction of the reel 2. Some of these ribs 28 serve as guide ribs for guiding the releasing member 6 in the direction to insert the legs 63 of the releasing member into the through holes 26, and the remaining ribs serve as reinforcing ribs for the reel hub 21.

The operation of the aforementioned reel locking mechanism 10 will be described below. When the magnetic tape cartridge 1 is, as shown in FIG. 1, in a non-operating state when it is in storage or for any other reason, the locking member 4, the releasing member 6 and the reel 2 are moved toward the lower case 32 of the cartridge case 3 under the urging force of the urging member 5, and accordingly the opening 32a disposed at the central portion of the lower case 32 is closed by the reel 2. At this time, the releasing member 6 is situated at its lowermost position where the lower surface of the releasing member 6 is in abutment with the upper surface of the bottom wall 21a of the reel hub 21, and each tip of the legs 63 projects beyond the tooth tips of the reel gear 24. The locking member 4, which is in abutment with the upper surface of the releasing member 6, is also situated at its lower position where the lock teeth 42 thereof are meshed with the lock teeth 29 of the interposing protrusions 27. The rotation of the reel 2 is thus blocked when the magnetic tape cartridge is in a non-operating state, and accordingly a locked state where drawing of the magnetic reel is blocked is obtained.

On the other hand, as shown in FIG. 2, when the magnetic tape cartridge 1 is loaded in the drive device and in an operating state, the disk portion 15 disposed at the distal end of the rotating shaft 12 of the rotary driving member 11 is brought closer the bottom surface of the reel 2. As a result, the driving gear 13 is meshed with the reel gear 24, the reel 2 is slightly moved upward and held in this position, and each tooth tip of the driving gear 13 is brought into abutment with the distal end of each leg 63 of the releasing member, thus pushing up the leg 63. In association with this, the releasing member 6 is moved upward against the urging force of the urging member 5, and the locking member 4 is also moved upward toward the releasing direction as one with the releasing member 6. As a result, meshing between the lock teeth 42 and 29 is released, and hence the reel 2 becomes rotatable. Then, unloading and loading of the magnetic tape are conducted by the drive device.

Figure 6A:
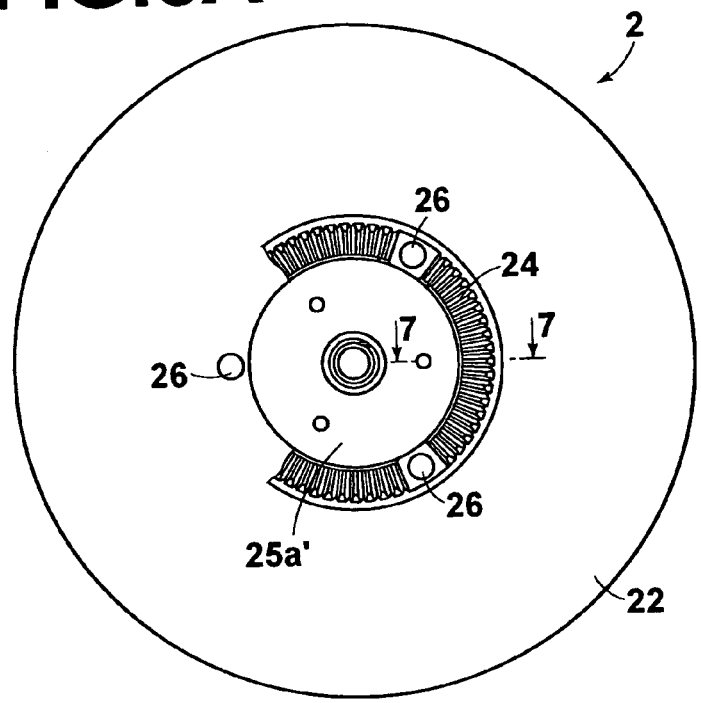
FIG. 6A is a bottom view of a conventional magnetic tape cartridge, with a reel gear being partially removed.
Figure 6B:
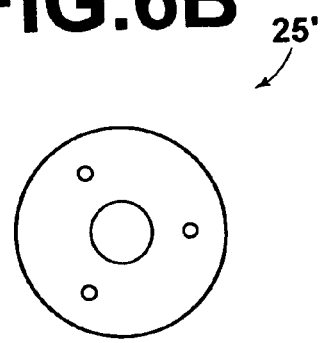
FIG. 6B is a bottom view of a metal plate used in the magnetic tape cartridge shown in FIG. 6A.
Figure 7:
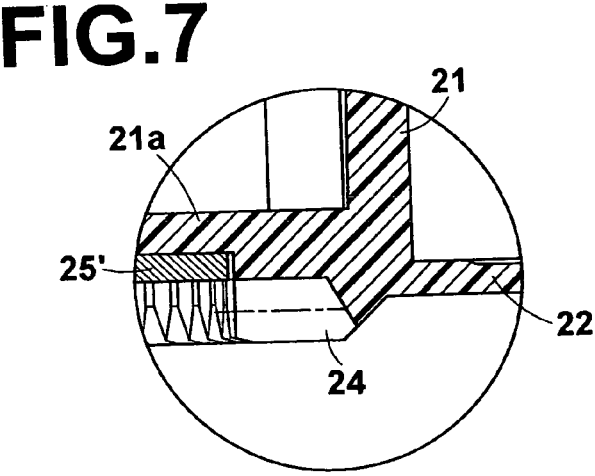
FIG. 7 is an enlarged cross-sectional view of the reel taken along line 7-7 in FIG. 6A.

As is apparent from the above description, in accordance with the particular embodiment of the invention, a metal plate 25 which has a larger diameter than that of a conventional metal plate 25' shown in FIG. 6B is used, and the outer periphery of the metal plate 25 is positioned under the inner facing surface of the reel gear 24, and accordingly the periphery of the metal plate 25 comes close to the rim of the reel hub 21. Accordingly, as is apparent from FIG. 5, the thickness of a portion where the reel gear 24 is formed becomes smaller than that of the conventional products, and therefore a "sink mark" becomes less likely to occur during molding. Further, an effect that a stiff metal plate 25 suppresses deformation of the reel hub when tape is wound can also be expected. In addition, due to the increased mass of the metal plate 25, the meshed state between the reel gear 24 and the driving gear during chucking can be maintained more reliably.

In the above-described embodiment, the metal plate 25 has the outer diameter that is substantially equal to the outer diameter of the pawl portion of the reel gear 24, and the outer periphery of the metal plate 25 is positioned under the inner facing surface of the reel gear such that the entire inner facing surface of the reel gear 24 is covered by the outer periphery of the metal plate 25. However, the object of the present invention is also achieved when the outer periphery of the metal plate is positioned under the inner facing surface of the reel gear 24 in a manner such that the outer peripheral edge of the metal plate 25 reaches at least the middle of a radial width of a pawl portion of the reel gear 24.

When the magnetic tape cartridge is not provided with the releasing member 6, there is no need to form a cutout 25a in the metal plate 25.

What is claimed is:

1. A magnetic tape cartridge comprising:
    a cartridge case, and
    a single reel which is rotatably housed in the cartridge case, the single reel having:
    (a) a reel hub around which a magnetic tape is wound and a lower part of which is closed by a bottom wall,
    (b) upper and lower flanges respectively extending radially outward from the outer peripheries of the upper and lower ends of the reel hub,
    (c) a reel gear provided in an annular form at an outer peripheral portion of a lower surface of the bottom wall of the reel hub so as to be meshable with a driving gear of a drive-side rotary driving member provided in a drive device; and
    (d) a metal plate which is to be magnetically attracted by the drive-side rotary driving member,
    wherein the metal plate is disposed on the bottom wall of the reel hub in a manner such that an outer periphery of the metal plate is positioned under the inner facing surface of the reel gear.

2. A magnetic tape cartridge according to claim 1, wherein the outer periphery of the metal plate is positioned under the inner facing surface of the reel gear in a manner such that the outer peripheral edge of metal plate reaches at least the middle of a radial width of a pawl portion of the reel gear.

3. A magnetic tape cartridge according to claim 2, further comprising:
    a locking member that is movable in an axial direction of the reel between a locked position for blocking rotation of the reel and a release position for releasing a locked state of the reel; and
    a releasing member for moving the locking member in the direction toward the release position in association with meshing between the driving gear of the drive-side rotary driving member and the reel gear,
    wherein:
    the locking member and the releasing member are provided within the reel hub,
    the releasing member includes a plurality of legs which respectively project outward through a plurality of through holes formed in the pawl portion of the reel gear when the driving gear and the reel gear are not meshed with each other, and are respectively pushed back into the plurality of through holes in association with meshing between the reel gear and the driving gear, and
    cutouts are formed in the outer peripheral edge of the metal plate such that the cutouts do not overlap the through holes formed in the pawl portion of the reel gear.

4. A magnetic tape cartridge according to claim 1, further comprising:
    a locking member that is movable in an axial direction of the reel between a locked position for blocking rotation of the reel and a release position for releasing a locked state of the reel; and
    a releasing member for moving the locking member in the direction toward the release position in association with meshing between the driving gear of the drive-side rotary driving member and the reel gear,
    wherein:
    the locking member and the releasing member are provided within the reel hub,
    the releasing member includes a plurality of legs that respectively project outward through a plurality of through holes formed in a pawl portion of the reel gear when the driving gear and the reel gear are not meshed with each other, and are respectively pushed back into the plurality of through holes in association with meshing between the reel gear and the driving gear, and
    cutouts are formed in the outer peripheral edge of the metal plate such that the cutouts do not overlap the through holes formed in the pawl portion of the reel gear.

5. A magnetic tape cartridge according to claim 1, wherein the outer periphery of the metal plate is positioned under the inner facing surface of the reel gear in a manner such that the outer peripheral edge of the metal plate reaches a radially outermost end of a radial width of a pawl portion of the reel gear.

6. A magnetic tape cartridge according to claim 5, further comprising:

a locking member that is movable in an axial direction of the reel between a locked position for blocking rotation of the reel and a release position for releasing a locked state of the reel; and a releasing member for moving the locking member in the direction toward the release position in association with meshing between the driving gear of the drive-side rotary driving member and the reel gear, wherein:

the locking member and the releasing member are provided within the reel hub, the releasing member includes a plurality of legs which respectively project outward through a plurality of through holes formed in the pawl portion of the reel gear when the driving gear and the reel gear are not meshed with each other, and are respectively pushed back into the plurality of through holes in association with meshing between the reel gear and the driving gear, and cutouts are formed in the outer peripheral edge of the metal plate such that the cutouts do not overlap the through holes formed in the pawl portion of the reel gear.

* * * * *